July 21, 1959     W. G. HARTFORD ET AL     2,896,196
APPARATUS FOR DETECTING DEFECTS IN SHEET MATERIALS
Filed May 18, 1955
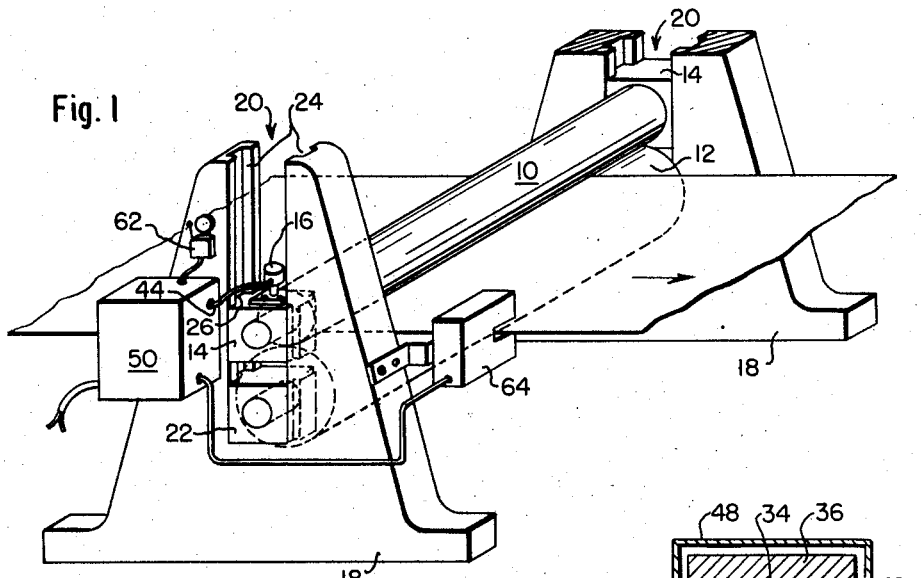
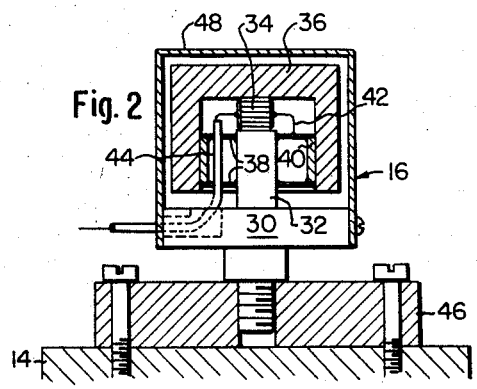
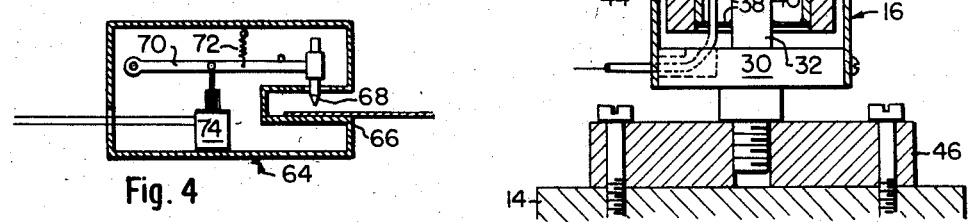
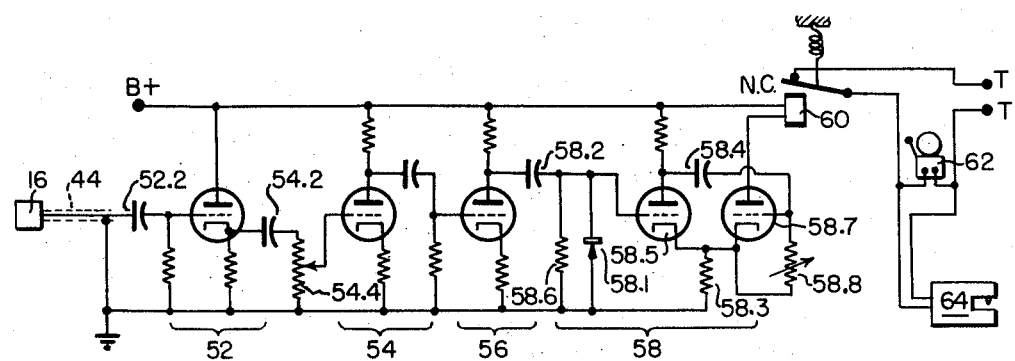
INVENTORS
WILLIS G. HARTFORD
JOSEPH W. HOLT
ERNEST JELLINEK
BY
ATTORNEYS United States Patent Office 2,896,196
Patented July 21, 1959

2,896,196
APPARATUS FOR DETECTING DEFECTS IN SHEET MATERIALS

Willis G. Hartford, Andover, Joseph W. Holt, Lawrence, and Ernest Jellinek, Marblehead, Mass., assignors to Champion International Company, Lawrence, Mass., a corporation of Massachusetts Application May 18, 1955, Serial No. 509,134

1 Claim. (Cl. 340—259)

This invention relates to the detection of defects in sheet materials, particularly defects in the form of lumps or other areas of suddenly increased thickness, and consists in a novel apparatus by which such defects in a continuously travelling web are caused to actuate appropriate electrical signalling means.

As described in the copending application of two of the inventors herein, Ser. No. 498,995, filed April 4, 1955, now Patent No. 2,826,911, lumps or other areas of increased thickness occurring in a travelling web may be detected by the impulse their impact creates in one of two opposed members between and in contact with which the web is passed. These impulses are readily detected by an acceleration sensitive transducer device associated with one of the members to produce an electric pulse in response to impulses in the member. It has, however, been found that pulses of this type are of extremely short duration, and may not be readily used to actuate most types of signalling devices, which in any installation will ordinarily include an electrically operated marking device for marking the web at locations where lumps appear, and perhaps also a bell, light or other signalling device.

The present invention provides a system by which electric pulses resulting from the passage of defective areas on the web may be used to actuate or energize electrical devices associated with the detection of such areas. The invention consists in general of a pair of members having opposed surfaces in contact with which the web is passed. One of the members is yieldingly mounted so as to respond to the impact of abrupt thickness variations occurring in the web and connects with an acceleration sensitive transducer device by which an electrical pulse is generated whenever the passage of a lump causes an impulse. The pulses of the member thus generated are used to trigger a delay circuit by which an electrical signal of sufficient duration to energize associated electrical devices is generated. Thus, although the pulse itself is of too short duration to be of optimum usefulness, ordinary electrical signalling or marking devices may nevertheless be actuated in response to the pulse from the signal triggered by it.

The delay circuit is preferably of the self restoring type by which after each triggered signal the circuit is in condition to respond to another signal. A suitable circuit is one commonly referred to as a one-shot or one-cycle multivibrator having a relay coil in the plate circuit of one of the tubes through which a signal of the desired duration is established. Other delay circuits of the self-restoring type may, however, also be used.

This invention will be better understood and appreciated from the following detailed description of a preferred embodiment selected for purposes of illustration and shown in the accompanying drawings in which:

Fig. 1 is a perspective view showing the organization of one preferred embodiment of this invention;

Fig. 2 is a cross-sectional elevation of the impulse detecting transducer;

Fig. 3 is a schematic diagram of a preferred circuit through which actuating signals are generated in response to pulses from the transducer, and Fig. 4 is a cross-sectional elevation of a device for marking the web in response to impulse caused by the passage of a lump.

In its general arrangement as shown in Fig. 1, the invention in its preferred embodiment includes a pair of vertically aligned rollers 10 and 12 of which the upper roller 10 is mounted on floating bearing blocks 14—14 so as to be supported on the lower roller 12. An acceleration-sensitive transducer 16 is mounted on one of the bearing blocks 14 so as to be responsive to impulses in the upper roller.

The rollers 10 and 12 are supported between base members 18—18, each formed with a vertical guideway 20—20 in which the bearing blocks 14—14 and 22—22 are carried. The lower bearing block 22—22, as will be seen, rests solidly on the bottom end of the guideways 20 while the upper bearing blocks 14—14 are each formed to slide freely in the guideways. In the illustrated embodiment, the guideway sides are formed with longitudinal grooves 24 and the upper bearing blocks 14—14 are provided with lateral extensions 26 accommodated in the grooves to retain them against axial displacement.

The transducer 16 mounted on one of the upper bearing blocks 14, as shown best in Fig. 2, consists in general of a base 30 having a base post 32 on which is carried a piezoelectric element 34 and a solid massive member 36 carried on the element 34. The massive member 36 provides by its inertia, a reference base between which and the post 32 reaction pressures on the element 34 may be developed upon upward acceleration of the base 30 and base post 32. The massive member 36 is conveniently formed as an inverted cup surrounding the post 32 and flexibly secured against relative lateral motion thereto by a pair of spaced flexible metal diaphragms 38 extending between the post and the inner walls of the cup. The outer edges of the diaphragms are secured, as by solder, to opposite ends of a short tube 40 which is fitted to the inner surface of a massive member 36.

The piezoelectric element 34 is conveniently formed of a stack of several crystal wafers of barium titanate or other piezoelectric material connected in electrical parallel by electrodes situated between adjacent wafers and at the top and bottom of the stack, with alternate electrodes connected in parallel to ground through a wire 42 connecting with the upper diaphragm 38, and the remaining alternate electrodes connecting in parallel to the output lead 44.

The impact detector 16 is fastened solidly through its base 30 to the floating bearing 14 by a mounting block 46 and is shielded by a cover 48 fastened to the base 30 surrounding the assembly.

The output lead 44 from the transducer 16 connects with an electronic circuit indicated generally at 50 through which pulses are provided to operate a warning device such as a bell 62 and to operate a marking device 64 so that the location of defects in the web may be readily spotted.

The electronic circuit is shown schematically in Fig. 3 and consists generally of a cathode follower stage 52 into the grid of which pulses from the transducer 16 are fed, a pair of amplifier stages 54 and 56, and a one cycle multivibrator stage 58. The pulses are fed to the cathode follower through a coupling capacitor 52.2, and the output from the cathode follower stage 52 feeds through a coupling capacitor 54.2 to a potentiometer 54.4 from which the grid signal for the amplifier stages is taken. The amplified pulses from the last amplifier stage 56 trigger a one-cycle cathode coupled multivibrator circuit 58 through a capacitor 58.2 in the grid circuit of the nonconducting, or normally off, tube 58.5. This grid circuit connects to ground through a grid leak resistor 58.6 in parallel with a rectifier 58.1 poled with its cathode connecting to the grid and its anode grounded.

The multivibrator circuit consists generally of a pair of triodes 58.5 and 58.7 having their cathodes joined and grounded through a resistor 58.3. A capacitor 58.4 connects the plate of the non-conducting tube 58.5 with the grid of the conducting tube 58.7 and connects through a variable discharge resistor 58.8 to the cathodes. Power signals for operating the electrical signalling devices and the like are transmitted through a normally closed relay having its coil 60 in the plate circuit of the conducting, or normally on, tube 58.7. The relay is thus energized to be open when the circuit is in the stable condition, and the response circuit controlled by it is open.

By means of this circuit, pulses from the transducer 16, a high impedance source are initially matched through the cathode follower with the input of the amplification stages 54 and 56 through which the pulses are amplified to be of sufficient magnitude to trigger the normally off tube 58.5 of the multivibrator 58. A sensitivity control provided by the potentiometer 54.4 affords control over the size of a lump necessary to actuate the detection circuit.

In the operation of the multivibrator 58, the grid and cathode of the normally on tube 58.7, being connected together through the variable resistor 58.8, are normally maintained at the same voltage, and the tube is conducting. The grid of the normally off tube 58.5 is on the other hand normally negative with respect to the cathode by virtue of the cathode resistor 58.3 between the grid and cathode through which the plate current of the normally on tube 58.7 flows. A positive pulse, however, to the grid of the normally off tube 58.5 will cause that tube to conduct and its plate voltage to decrease. This decrease is applied to the grid of the normally on tube 58.7 through the coupling capacitor 58.4 and cuts off that tube, at which time, a relay 60 deenergizes, its contacts close and the response circuit to the signalling and working devices is energized.

After the delay circuit is triggered by a positive pulse from the transducer 16 the normally on tube 58.7 remains cut-off until the charge on the grid has dissipated through the variable resistor 58.8, a period largely dependent on the time constant of the RC circuit associated with the capacitor 58.4. During this period the relay coil 60 remains deenergized and the energizing circuit from the terminals T—T to the bell 62 and marking device 64 is complete.

Negative pulses which would otherwise cut off the normally off tube 58.5 prematurely after it has fired, are nulled by the rectifier 58.1, typically a germanium diode, connecting the grid to ground and poled to maintain the grid positive with respect to ground.

The marking device is conveniently mounted at one side of the web and is shown schematically in Fig. 4. It consists generally of a casing formed with a platform 66 supporting an edge of the web, and a marking tool 68, e.g. a crayon, mounted on a spring biased arm 70 connecting with a solenoid actuator 74 by which the marking tool is brought down on the web when the solenoid is energized. Thus, whenever the circuit from the power terminals T—T is closed through actuation of the relay 60, the crayon 68 is brought into contact with the web to mark the spot where a defect appears.

Although there will be a lag in the full actuation of the marking device after initial energization, its location is adjusted so that during the delay between the passage of a lump between the nip of the rollers 10 and 12 and full actuation of the marking device, the defect is moved from the nip of the rollers 10 and 12 into alignment with the marking device, and each mark thus appears as nearly as possible opposite the defect marked by it. Also, since the pulse triggering each signal is of much shorter duration than the signal, several pulses corresponding to the passage of several defects may occur during one signal, and to minimize the number and separation of defects that may so go undetected, the signal is adjusted by varying the discharge resistor 58.8 through which capacitor 58.4 is discharged to provide a signal of a duration no longer than is necessary to actuate the associated alarm and/or marking devices.

After the web has passed through the detecting apparatus of this invention, in which the location of each defect has been marked, the rejection of defective sheets cut from the web becomes a simple matter of separating the marked sheets from the unmarked sheets. This may be done manually and is then far less exacting and fatiguing than the visual inspection commonly employed for detecting defects initially. Alternatively, the marked sheets may be spotted by a photoelectric device employed in conjunction with electrically operated apparatus for automatically discarding a sheet in response to a signal from the photoelectric device.

From the foregoing description it will be seen that this invention provides a versatile and sensitive device by which the inspection of webs of sheet materials, such as paper, is greatly facilitated. The sensitivity control provided by the potentiometer 54.4 affords an adjustment by which the response level may be selected.

It has been found, for instance, that at maximum sensitivity, lumps having a thickness of one ten thousandths of an inch and an area of about one square millimeter in a web travelling 700 feet per minute will register through the response circuit, and that the marking of the web at the location of the defect increases several fold the speed and accuracy of the final inspection.

Although this invention has been described in detail with reference to a preferred embodiment, it is contemplated that obvious modifications will occur to those skilled in the art, and that such modifications may be made without departing from the scope of this invention.

Having thus disclosed this invention and described in detail the preferred embodiment thereof, we claim and desire to secure by Letters Patent:

A monitoring device for detecting localized areas of increased thickness in a travelling web comprising means engaging the surface of a travelling web yieldable in response to thickness variations in said web; an acceleration sensitive transducer including a piezoelectric member providing an electric pulse in response to movement of said surface engaging means; a variable gain amplifier adapted to amplify said pulse; a one cycle multivibrator circuit adapted to receive amplified pulses from said amplifier and to actuate a relay in response thereto, said multivibrator circuit including a normally conducting vacuum tube having a plate, a grid and a cathode and a normally non-conducting vacuum tube having a plate, a grid and a cathode, said cathodes being connected together and grounded through a common cathode resistance, said normally non-conducting tube having its grid connected to receive positive pulses from said amplifier and its plate connected through a condenser to the grid of said normally conducting tube, said normally conducting tube having a relay in its plate circuit and having a circuit from grid to cathode which includes a variable resistor, whereby the charging time for said condenser may be varied; and signalling means operated by said relay.

References Cited in the file of this patent
UNITED STATES PATENTS

| | | |
|---|---|---|
| 2,392,010 | Stevens | Jan. 1, 1946 |
| 2,411,401 | Welch | Nov. 19, 1946 |
| 2,701,356 | Coleman | Feb. 1, 1955 |
| 2,735,292 | Apps | Feb. 21, 1956 |
| 2,735,329 | Meunier | Feb. 21, 1956 |

FOREIGN PATENTS

| | | |
|---|---|---|
| 662,612 | Great Britain | Dec. 5, 1951 |